United States Patent [19]

Blinne et al.

[11] Patent Number: 4,567,248

[45] Date of Patent: Jan. 28, 1986

[54] BRANCHED, HIGH MOLECULAR WEIGHT, THERMOPLASTIC POLYARYLENE ETHERS CONTAINING NITRILE GROUPS, AND THEIR PREPARATION

[75] Inventors: Gerd Blinne, Bobenheim; Herbert Bender, Boehl-Iggelheim; Peter Neumann, Wiesloch, all of Fed. Rep. of Germany

[73] Assignee: BASF Aktiengesellschaft, Fed. Rep. of Germany

[21] Appl. No.: 681,243

[22] Filed: Dec. 13, 1984

[30] Foreign Application Priority Data

Dec. 15, 1983 [DE] Fed. Rep. of Germany ....... 3345416

[51] Int. Cl.$^4$ .............................................. C08G 65/40
[52] U.S. Cl. .................... 528/211; 528/125; 528/126; 528/128; 528/172; 528/174; 528/176; 528/185; 528/191; 528/219
[58] Field of Search ............... 528/176, 191, 211, 185, 528/172, 174, 219, 125, 126, 128

[56] References Cited

U.S. PATENT DOCUMENTS

| | | | |
|---|---|---|---|
| 3,730,946 | 5/1973 | Heath et al. | 528/211 |
| 3,784,504 | 1/1974 | Feasey | 528/211 |
| 3,798,255 | 3/1974 | Watts, Jr. | 260/465 |
| 3,839,300 | 10/1974 | Ensor et al. | |
| 3,960,815 | 6/1976 | Darsow et al. | 260/49 |
| 4,042,567 | 8/1977 | Sundermann | 528/211 |
| 4,108,837 | 8/1978 | Johnson et al. | 528/211 |
| 4,200,728 | 4/1980 | Blinne et al. | 528/174 |
| 4,324,881 | 4/1982 | Blinne et al. | 528/173 |

FOREIGN PATENT DOCUMENTS

| | | | |
|---|---|---|---|
| 847963 | 7/1970 | Canada . | |
| 2122562 | 9/1972 | France | 23/00 |
| 2172143 | 9/1973 | France | 23/00 |
| 1078234 | 8/1967 | United Kingdom . | |
| 1201534 | 8/1970 | United Kingdom | 23/16 |
| 1264900 | 2/1972 | United Kingdom . | |

Primary Examiner—Lester L. Lee

Attorney, Agent, or Firm—Keil & Weinkauf

[57] ABSTRACT

Branched, high molecular weight, thermoplastic polyarylene ethers which contain nitrile groups and are composed of repeating units of the formula I $$-E_1-O-E_2-O-$$

where $E_1$ is a radical derived from a dihalobenzene compound and $E_2$ is a radical derived from a bisphenol, and contain from 0.01 to 5 mol %, based on the radical $E_1$, of one or more radicals derived from polyhalo compounds of the formulae

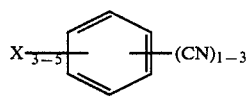

(II)

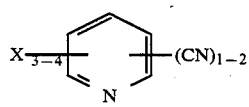

(III)

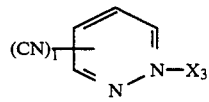

(IV)

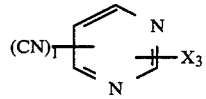

(V)

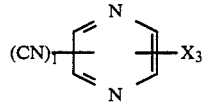

(VI)

where X is fluorine or chlorine, and their preparation.

9 Claims, No Drawings

BRANCHED, HIGH MOLECULAR WEIGHT, THERMOPLASTIC POLYARYLENE ETHERS CONTAINING NITRILE GROUPS, AND THEIR PREPARATION

Polymers which contain sulfonyl and ether groups are known. German Published Application DAS No. 1,545,106 describes linear polyarylene polyethers which are prepared by reacting an alkali metal-bisphenol double salt with an equimolecular amount of a dihalobenzene compound in the presence of a sulfoxide or sulfone as a solvent. According to German Laid-Open Applications DOS Nos. 1,957,091 and 2,731,816 and Canadian Pat. No. 847,963, polysulfonyl ethers are obtained from a phenolate and an aromatic dihalo compound in the presence of a high-boiling polar solvent and an anhydrous alkali metal carbonate. These polymers have the disadvantage that they are not sufficiently stable to acids and alkalis and to organic solvents at elevated temperatures. Moreover, their surface hardness is unsatisfactory.

Furthermore, German Laid-Open Application Dos No. 2,940,190 discloses the preparation of amide-containing polyethers. Although these branched polymers have improved stability to solvents, the quality of their colar and their hardness properties are unsatisfactory. Moreover, the monomers required for their preparation are technically difficult to obtain.

According to German Pat. No. 2,305,413, branched polyethers are obtained in the presence of a small amount of a triphenol. Although such polyethers have improved stability to solvents, their surface hardness is still unsatisfactory.

U.S. Pat. No. 801,837 Defense discloses crosslinked polyethers which contain, as crosslinking agents, radicals which are derived from polyhaloheterocycles. The surface hardness of these polymers is unsatisfactory.

It is an object of the present invention to prepare polyethers which possess improved stability to solvents and surface hardness, using readily obtainable starting materials and without having to alter the proven methods for the preparation of polyethers, so that monomers of this type can also be used for the synthesis of various compolymers or block copolymers by conventional processes for the preparation of polyethers.

The present invention relates to branched, high molecular weight, thermoplastic polyarylene ethers which contain nitrile groups and consist of repeating units of the formula $$-E_1-O-E_2-O- \qquad I$$

where $E_1$ is a radical derived from a dihalo benzene compound and $E_2$ is a radical derived from a bisphenol, and branching agents, and contain from 0.01 to 5 mol%, based on $E_1$, of one or more radicals derived from polyhalo compounds of the formulae

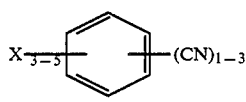
(II)

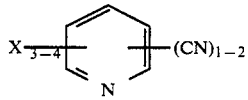
(III)

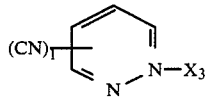
(IV)

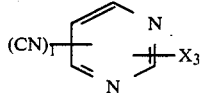
(V)

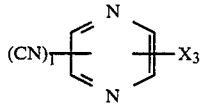
(VI)

where X is fluorine or chlorine.

The present invention furthermore relates to a process for the preparation of branched, high molecular weight, thermoplastic polyarylene ethers containing nitrile groups by polycondensation of essentially equivalent amounts of a bisphenol, or of a mixture of several bisphenols, with a dihalobenzene compound, or a mixture of several dihalobenzene compounds, and branching agents, in the presence of an anhydrous alkali metal carbonate, wherein one or more polyhalobenzene compounds of the formulae

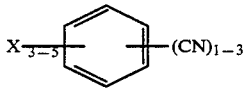
(II)

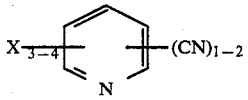
(III)

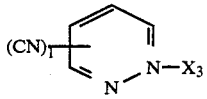
(IV)

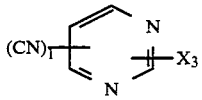
(V)

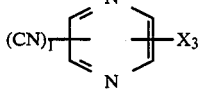
(VI)

where X is fluorine or chlorine, are present as branching agents in an amount of from 0.01 to 5 mol %, based on the amount of dihalobenzene compounds.

The novel branched polyarylene ethers containing nitrile groups possess improved stability to solvents and stress corrosion cracking coupled with good surface hardness. They can be obtained using readily available monomers and without having to alter the proven processes for the preparation of polyethers. Moreover, copolymers and block copolymers can be prepared in a simple manner by varying the monomeric starting materials.

Preferred bisphenols are those of the formula VII

HO—AR$^1$—(A$^1$)$_n$—Ar$^1$—$_m$OH (VII)

where Ar$^1$ is an aromatic radical of 6 to 12 carbon atoms, in particular a phenylene radical, A$^1$ is a divalent radical from the group consisting of —C(CH$_3$)$_2$—, —O—, —CO— and —SO$_2$—, and n and m are each 0 or 1. Examples of suitable bisphenols are hydroquinone, resorcinol, 4,4'-bisphenol, 2,2-bis-(4-hydroxyphenyl)-propane, bis-(4-hydroxyphenyl) ketone and bis-(4-hydroxyphenyl) sulfone. The bisphenols can be used individually or in the form of mixtures. Bis-(4-hydroxyphenyl) sulfone and 2,2-bis-(4-hydroxyphenyl)-propane have become particularly important.

Preferred dihalobenzene compounds are those of the formulae VIII to X

(VIII)

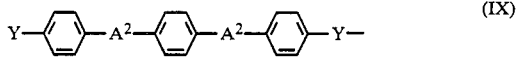

(IX)

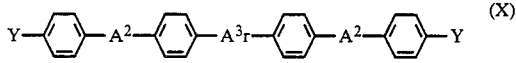

(X)

and where X is fluorine or, preferably, chlorine, A$^2$ is —CO— or, preferably —SO$_2$—, A$^3$ is —O— or —S—, and r is 0 or 1.

Examples of suitable polyhalobenzene compounds are bis-(4-chlorophenyl) sulfone, bis-(4-fluorophenyl) sulfone, bis-(4-chlorophenyl) ketone, 1,4-bis-(4-chlorobenzoyl)-benzene, 1,4-bis-(4-chlorobenzenesulfonyl)-benzene, 4,4'-bis-(4-chlorobenzoyl)-diphenyl ether, 4,4'-bis-(4-chlorobenzoyl)-diphenyl sulfide, 4,4'-bis-(4-chlorobenzoyl)-diphenyl, 4,4'-bis-(4-chlorobenzenesulfonyl)-diphenyl ether, 4,4'-bis-(4-chlorobenzenesulfonyl)-diphenyl sulfide and 4,4'-bis-(4-chlorobenzenesulfonyl)-diphenyl. The halobenzene compounds can be used individually or as mixtures, bis-(4-chlorophenyl) sulfone and 4,4'-bis-(4-chlorobenzoyl)-diphenyl ether being preferably used.

Particularly preferably, not less than 70 mol %, based on the amount of bisphenols used, of bis-(4-hydroxyphenyl) sulfone or 2,2-bis-(4-hydroxyphenyl)-propane and not less than 70 mol %, based on the amount of dihalobenzene compounds, of bis-(4-chlorophenyl) sulfone are used.

The branching agents according to the invention are polyhalocompounds of the formulae II to VI

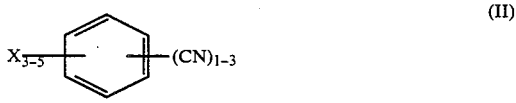

(II)

(III)

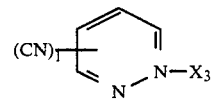

(IV)

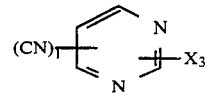

(V)

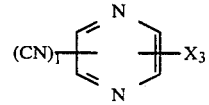

(VI)

and where X is fluorine or, preferably, chlorine. Advantageously, the chlorine atoms are ortho and/or para to the nitrogen-containing radicals.

Examples of suitable polyhalo compounds of the formulae I-V are pentachlorobenzonitrile, pentafluorobenzonitrile, tetrachlorophthalodinitrile, tetrachloroisophthalodinitrile, tetrachloropyridinecarboxylic acid nitrile, trichloropyridinedicarboxylic acid dinitrile and tetrachloropyrazine.

Particularly preferred polyhalo compounds are those of the formulae II and III, in particular tetrachlorophthalodinitrile, pentachlorobenzonitrile and tetrachloroisophthalodinitrile.

The reaction is carried out in the presence of an anhydrous alkali metal carbonate, sodium carbonate or potassium carbonate, or mixtures of these, being particularly suitable. Potassium carbonate has proven particularly useful.

The polymers can be prepared by first allowing the bisphenols to react completely with the dihalobenzene compounds, and only then adding trifunctional or polyfunctional polyhalo compounds. On the other hand, it is also possible to add the halo compounds in the reverse sequence.

The stated polyhalo compounds of the formulae II to VI are advantageously used in amounts of from 0.01 to 5, preferably from 0.1 to 2, mol %, based on the amount of dihalobenzene compounds.

In a preferred embodiment of the process, 1 mole of bisphenol, or of a mixture of bisphenols, is reacted with from 0.9 to 1.1 moles, preferably about 1 mole, of dihalobenzene compounds and branching agents of the formulae II to VI, and from 1.0 to 2.2, preferably from 1.1 to 2.0, moles, of anhydrous potassium carbonate, in the absence of a solvent, preferably in the melt at from 200° to 400° C., or at a temperature as high as that at which the components begin to decompose, preferably from 250° to 350° C. The novel polyhalo compounds of the formulae II to VI can be added at any time during the reaction.

The reaction mixture is subjected to polycondensation at the stated temperature until the required degree of condensation is reached. The polycondensation time is, as a rule, from 0.1 to 10, preferably from 0.2 to 2, hours, and depends on the starting compounds selected. All chemically inert groups are suitable terminal groups for the polycondensates. To incorporate the terminal groups, a small amount of an appropriate monofunctional compound is advantageously added to the polycondensation mixture when the desired degree of polycondensation has been achieved. Aliphatic or aromatic monohalo compounds, in particular methyl chloride, are preferably used.

The inorganic by-products, eg. sodium chloride or potassium chloride, are as a rule removed by a suitable method, such as dissolving and filtering, sieving or extracting.

In another preferred method, 1 mole of bisphenol is reacted with about 1 mole of dihalobenzene compounds and the stated amounts of polyhalo compounds and from 1.0 to 2.2 moles of an anhydrous alkali metal carbonate in a polar aprotic solvent at from 150° to 300° C., preferably from 180° to 250° C., and the water formed during the reaction is removed, for example with the aid of an azeotrope former, but can also be distilled off in the absence of this.

Suitable polar aprotic solvents are N-substituted acid amides, sulfoxides and sulfones, such as N,N-dimethylformamide, N,N-dimethylacetamide, N-methylpyrrolidone, dimethyl sulfoxide, dimethyl sulfone, tetramethylene sulfone or diphenyl sulfone. N-Methylpyrrolidone is preferably used.

The polar aprotic solvents are used as a rule in amounts of from 5 to 100, preferably from 10 to 20, moles per mole of bisphenol. This means that from 5 to 50, preferably from 20 to 40, % strength by weight polymer solutions are obtained.

Suitable water azeotrope formers are all substances which boil at the reaction temperature under atmospheric pressure and can be mixed homogeneously with the reaction mixture without undergoing chemical reactions. Examples of azeotrope formers of the stated type are chlorobenzene, toluene and xylene, the first-mentioned compound being preferably used.

Advantageously, the reaction mixture is heated in a first reaction stage, advantageously for from 0.5 to 4, preferably from 1 to 2, hours, until not less than 90, preferably from 90 to 96, % by weight of the theoretically possible amount of water has been separated off.

In the second reaction stage, condensation is continued until the mixture is completely free of water. To do this, an azeotrope former can be added continuously to the reaction mixture, and the azeotrope mixture formed distilled off at the same time. The reaction time is as a rule from 0.5 to 4, preferably from 1 to 2, hours.

When the desired molecular weight has been reached, the polycondensation is terminated by introducing suitable monohalo compounds, such as methyl chloride.

The polyether can be isolated in various ways. In one possible procedure, it is precipitated with a precipitating agent, eg. water and/or methanol. It is also possible to evaporate the solvent. The inorganic components are removed from the polyether by a suitable method, such as dissolving, filtering or sieving.

The polyethers obtainable according to the invention have reduced viscosities (measured at 23° C. in 1% strength by weight sulfuric acid) of from 0.4 to 1.5, preferably from 0.6 to 1.2. This corresponds to molecular weights of about 16,000–120,000, preferably 25,000–80,000.

The polyethers which can be obtained are useful for the production of moldings, fibers, films, adhesives and coating materials.

The Examples which follow illustrate the invention. Parts are by weight. Parts by weight bear the same relation to parts by volume as that of the kilogram to the liter. The reduced viscosity ($\eta_{red}$) was measured at 24° C. in 1% strength by weight sulfuric acid and calculated in accordance with the equation $$\eta_{red} = \frac{\eta_{spec}}{C}$$

EXAMPLE 1

140 parts of anhydrous potassium carbonate are added to 228.3 parts of 2,2-bis-(4-hydroxyphenyl)-propane in 900 parts of N-methylpyrrolidone. The reaction mixture is heated to 190° C. in the course of two hours, water being distilled off continuously. After 18 parts of water have been removed, 285.7 parts of bis-(4-chlorophenyl) sulfone and 1.38 parts of pentachlorobenzonitrile are added, and the reaction mixture is stirred for 7 hours at 190° C. The polycondensation is terminated by passing in a stream of methyl chloride for 30 minutes. 600 ml of N-methylpyrrolidone are added, after which the inorganic components are filtered off and the polymer is precipitated in water and dried for 12 hours at 80° C. under reduced pressure. It has the properties listed in Table 1.

EXAMPLE 2

140 parts of anhydrous potassium carbonate are added to 250.3 parts of bis-(4-hydroxyphenyl) sulfone in 900 parts of N-methylpyrrolidone, and a procedure similar to that described in Example 1 is followed, except that, after the addition of 285.7 parts of bis-(4-chlorophenyl) sulfone and 1.38 parts of pentachlorobenzonitrile, the mixture is stirred for 8 hours at 210° C. The polymer obtained is described in detail in Table 1.

EXAMPLES 3 TO 6

A procedure similar to that described in Example 1 is followed, except that the monomers listed in Table 1 are employed. The results are shown in Table 1.

COMPARATIVE EXAMPLES A TO G

The procedure in A, C, D and G is carried out similarly to Example 1, except that the monomers listed in Table 2 are employed. Comparative experiment B is carried out similarly to Example 2. The procedure in Experiment E is as described in Example 1 of German Laid-Open Application DOS No. 2,940,190, while the procedure in F is as described in Example 1 of German Pat. No. 2,305,413. The properties of the polymers are described in Table 2.

TABLE 1

| | | Polyhalo compounds | | | | |
| Example | Bisphenol (parts) | bifunctional (parts) | crosslinking (parts) | $\eta_{red}$ (dl/g) | Stability to solvents* | Surface hardness |
| --- | --- | --- | --- | --- | --- | --- |
| 1 | 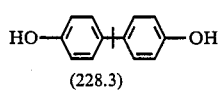 (228.3) | 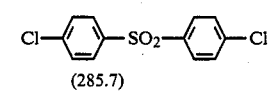 (285.7) | 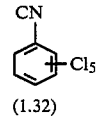 (1.32) | 0.90 | very good | very good |

TABLE 1-continued

| Example | Bisphenol (parts) | Polyhalo compounds bifunctional (parts) | crosslinking (parts) | $\eta_{red}$ (dl/g) | Stability to solvents* | Surface hardness |
|---|---|---|---|---|---|---|
| 2 | 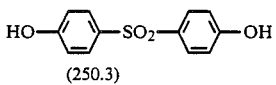 (250.3) | 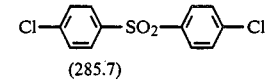 (285.7) | 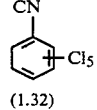 (1.32) | 0.85 | very good | good |
| 3 | 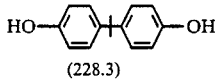 (228.3) | 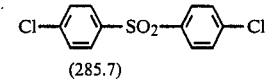 (285.7) |  (1.38) | 1.05 | good | very good |
| 4 | 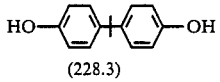 (228.3) | 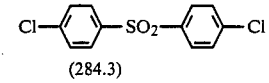 (284.3) |  (2.75) | 1.10 | very good | very good |
| 5 | 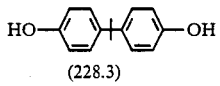 (228.3) | 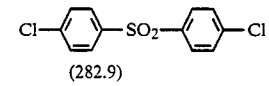 (282.9) |  (4.14) | 0.95 | very good | very good |
| 6 | 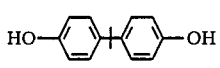 (228.3) | 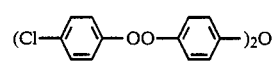 (446.0) |  (0.83) | 0.85 | very good | good |

TABLE 2

| Comparative example | Bisphenol (parts) | Polyhalo compounds bifunctional (parts) | crosslinking (parts) | $\eta_{red}$ (dl/g) | Stability to solvents* | Surface hardness |
|---|---|---|---|---|---|---|
| A | 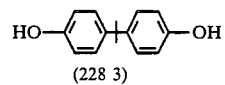 (228.3) | 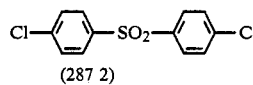 (287.2) | — | 0.95 | poor | very poor |
| B | 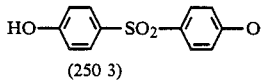 (250.3) | 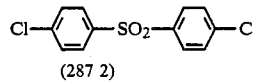 (287.2) | — | 1.05 | poor | poor |
| C | 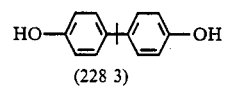 (228.3) | 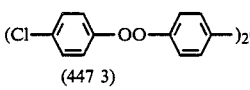 (447.3) | — | 0.85 | moderate | moderate |
| D | 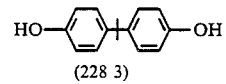 (228.3) | 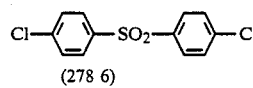 (278.6) |  (8.0) | cross-linked | Cannot be processed and therefore cannot be tested | |
| E | 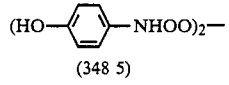 (348.5) | 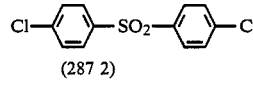 (287.2) | — | 0.75 | moderate | poor |
| F | 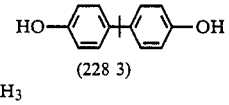 (228.3)  (3.48) | 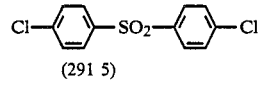 (291.5) | — | 1.10 | good | poor |

TABLE 2-continued

| Comparative example | Bisphenol (parts) | Polyhalo compounds bifunctional (parts) | | crosslinking (parts) | $\eta_{red}$ (dl/g) | Stability to solvents* | Surface hardness |
|---|---|---|---|---|---|---|---|
| G | 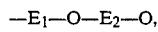 (228 3) | 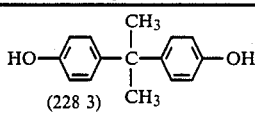 (278 6) | | 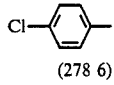 (2 0) | 1 05 | good | poor |

*Tested in methylene chloride, acetone and chlorobenzene.

We claim:

1. A branched, high molecular weight, thermoplastic polyarylene ether which contains nitrile groups and repeating units of the formula I $$-E_1-O-E_2-O, \qquad I$$

where $E_1$ is a halogen-free residuum of a dihalobenzene compound and $E_2$ is a HO-free residuum from a bisphenol, and contains from 0.01 to 5 mol %, based on the radical $E_1$, of one or more halogen-free residuum of polyhalo compounds of the formulae

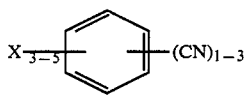 (II)

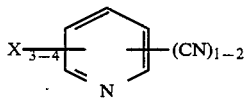 (III)

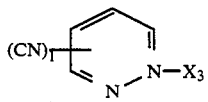 (IV)

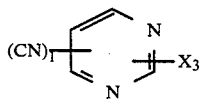 (V)

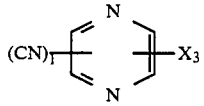 (VI)

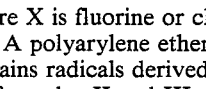

where X is fluorine or chlorine.

2. A polyarylene ether as set forth in claim 1, which contains radicals derived from polyhalo compounds of the formulae II and III.

3. A polyarylene ether as set forth in claim 1, which consists of radicals derived from bis-(4-halophenyl) sulfone and bis-(4-hydroxyphenyl) sulfone and/or 2,2-bis-(4-hydroxyphenyl)-propane.

4. A process for the preparation of a branched, high molecular weight, thermoplastic polyarylene ether polycondensate containing nitrile groups, which comprises reacting essentially equivalent amounts of a bisphenol, or of a mixture of several bisphenols, with a dihalobenzene compound or mixture of several dihalobenzene compounds, and one or more polyhalobenzene compound of the formulae

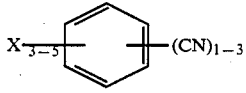 (II)

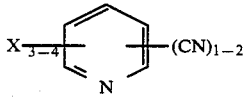 (III)

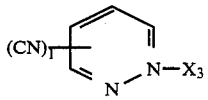 (IV)

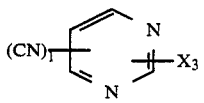 (V)

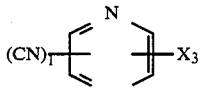 (VI)

where X is fluorine or chlorine, in an amount of from 0.01 to 5 mol %, based on the amount of dihalobenzene compounds, used, in the presence of an anhydrous alkali metal carbonate.

5. A process as set forth in claim 4, wherein from 0.1 to 2 mol %, based on the amount of dihalobenzene compounds, of polyhalo compounds of the formulae II to VI is used.

6. A process as set forth in claim 4, wherein polyhalobenzene compounds of the formulae II and III are present.

7. A process as set forth in claim 4, wherein not less than 70 mol %, based on the amount of dihalobenzene compounds used, of bis-(4-chlorophenyl) sulfone is employed.

8. A process as set forth in claim 4, wherein not less than 70 mol %, based on the amount of bisphenols used, of bis-(4-hydroxyphenyl) sulfone is employed.

9. A process as set forth in claim 4, wherein not less than 70 mol %, based on the amount of bisphenols, of 2,2-bis-(4-hydroxyphenyl)-propane is used.

* * * * *